Patented Jan. 30, 1951

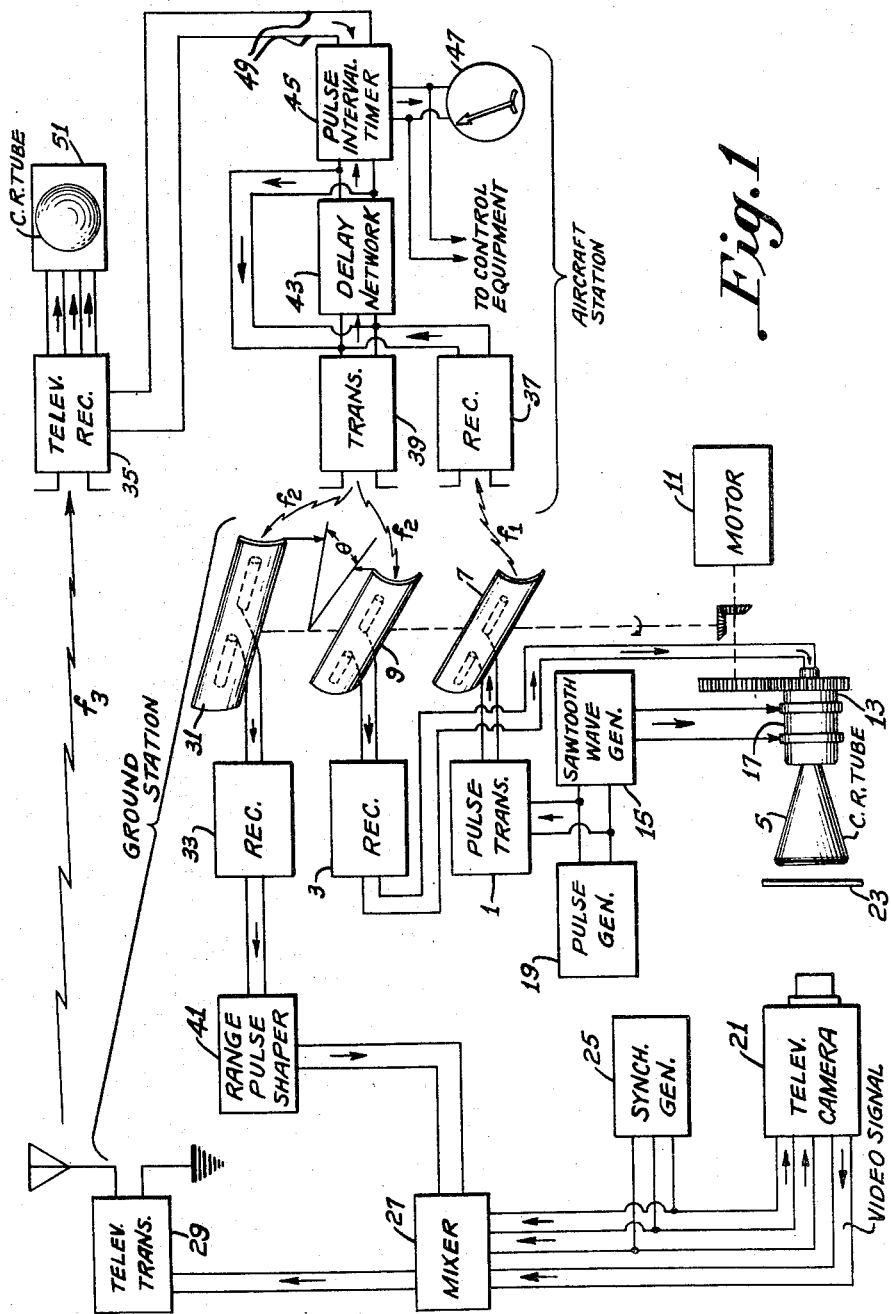

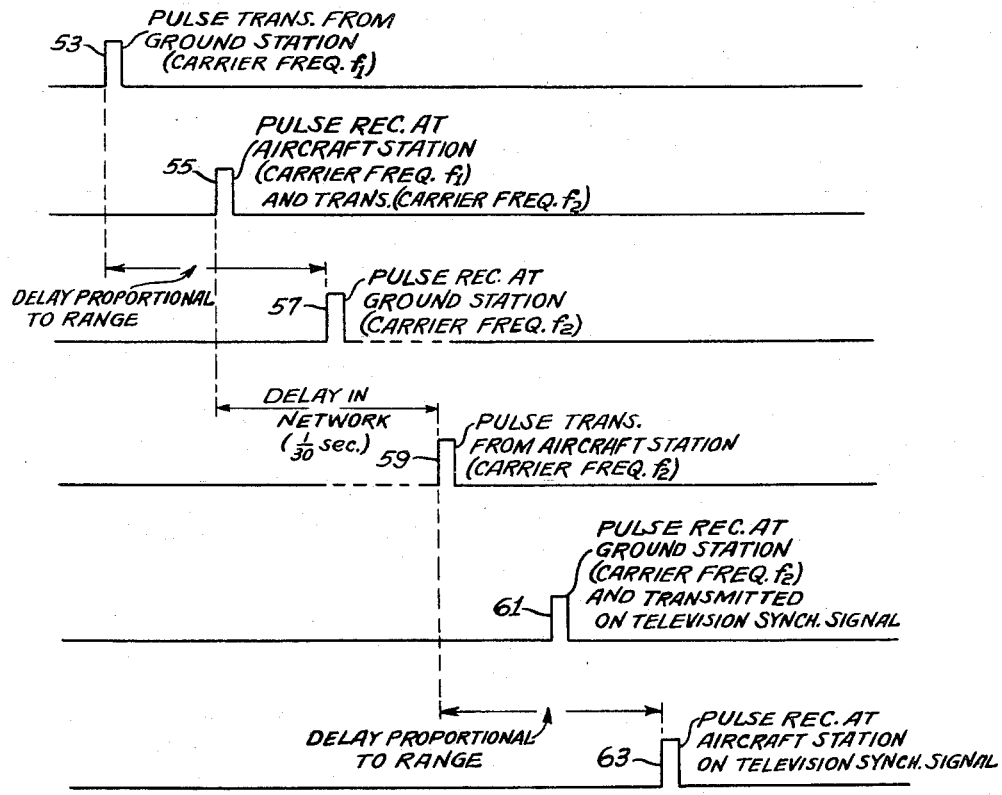

2,539,901

UNITED STATES PATENT OFFICE 2,539,901

PICTORIAL DISPLAY RADAR SYSTEM, INCLUDING DISTANCE MEASURING SYSTEM

Douglas H. Ewing, Westmont, N. J., assignor to Radio Corporation of America, a corporation of Delaware Application July 10, 1947, Serial No. 760,147

5 Claims. (Cl. 343—6)

This invention relates to radio navigation systems for aircraft, and more particularly to improvements in systems of the type described in copending U. S. patent application Serial No. 607,999½, filed July 31, 1945, by Loren F. Jones, and entitled "Radio Navigation Systems," wherein a plan position indication of aircraft within the service area of a ground station is produced by radar means at said ground station and transmitted by television, together with other pertinent information, to the aircraft.

The principal object of the present invention is to provide means for supplying, on an aircraft, information as to its distance or range from the ground station.

Another object is to provide means supplying said range information in a form suitable for controlling automatic flight mechanism or other equipment requiring adjustment as a function of range.

The invention will be described with reference to the accompanying drawing, wherein Figure 1 is a schematic block diagram of a system embodying the invention and Figure 2 is a group of graphs illustrating the time relationships between various pulses produced in the operation of the system of Figure 1.

As described and claimed in the above-mentioned Jones application, a ground-based radar system is set up to provide plan position indication of aircraft within the service area of the ground station, and the map-like display is sent by television to all properly equipped aircraft in the area. Referring to Figure 1, the left-hand portion of the drawing shows the equipment at the ground station, including that required in the practice of the present invention, and the right-hand portion of Figure 1 shows the airborne installation. Although only one set of aircraft equipment is shown, a plurality of similar aircraft stations may operate in the vicinity of the same ground station.

The ground station includes a search radar system comprising a pulse transmitter 1, a pulse receiver 3, and a cathode ray indicator 5. For the purpose of clarity in the present description, the transmitter 1 and the receiver 3 are provided with separate antennas 7 and 9 respectively, although it will be understood by those skilled in the art that a single antenna may be used, with suitable circuit arrangements for isolating the receiver from the transmitter during transmission. The antennas 7 and 9 are directive, with their directive axes substantially coincident, and are continuously rotatable in azimuth by a motor 11.

The output circuit of the receiver 3 is connected to the beam intensity control electrode of the cathode ray tube 5. The tube 5 is provided with a rotatable deflection yoke 13 which is coupled to the motor 11 for rotation in synchronism with the antennas 7 and 9. A sawtooth wave generator 15 energizes the yoke 13 through slip rings 17. A pulse generator 19 is connected to modulate the transmitter 1 and also to control the sawtooth wave generator 15, so that a sawtooth wave is initiated concurrently with each pulse.

A television camera 21 is focused on the face of the cathode ray tube 5, over which a transparent map 23 may be superimposed. A synchronizing signal generator 25 provides line and frame synchronizing signals from the camera 21, in accordance with known television practice. The synchronizing signals are also combined in a mixer 27 with the video signal output of the camera 21 and applied to a television transmitter 29.

In addition to the equipment thus far described, which is generally the same as that disclosed in the above-mentioned Jones application, a third directional antenna 31 is coupled to the motor 11 for rotation with the antennas 7 and 9. The antenna 31 is angularly displaced so that its directive axis lags that of the antennas 7 and 9 by a small angle $\theta$. A receiver 33 is connected to the antenna 31 and is designed to operate at a frequency $f_2$. The output of the receiver 33 is applied through a wave shaping circuit 41 to the mixer 27 for transmission with the television signals by the transmitter 29.

The airborne equipment includes a television receiver 35 responsive to television signals on a carrier frequency $f_3$ from the ground television transmitter 29, a pulse receiver 37 responsive to the carrier frequency $f_1$ of the pulse transmitter 1, and a transmitter 39 operative at a frequency $f_2$. The output of the receiver 37 is applied to the transmitter 39 and to a delay network 43. The network 43 is designed to provide a delay approximately equal to the interval between the instant the directive axis of the antenna 7 lies in a given direction and the instant the axis of the antenna 31 lies in that same direction. For example, suppose the antennas rotate at the rate of ten revolutions per minute or $$\frac{10}{60} \times 360 = 60 \text{ degrees per second}$$

and the angle $\theta$ between the antenna axes is two degrees. The network 43 is then designed to provide a delay of 1/30 second.

The output circuit of the delay network 43 is connected to the transmitter 39 and to a pulse interval timer 45. The interval timer 45 may be a so-called "flip-flop" or Eccles-Jordan circuit, including a meter 47 in one of its branches. A pulse applied to the circuit 45 from the network 43 initiates the flow of current through the meter 47. A pulse applied to the circuit 45 at another pair of input terminals 49 stops the flow of current in the meter 47.

The television receiver 35 is connected to the intensity control electrode of a cathode ray tube 51, to modulate the cathode ray beam in response to the video signal received from the ground station transmitter 29. The receiver 35 includes conventional sync separator and deflection generator means controlling the movement of the beam in the cathode ray tube 51. The receiver 35 also includes means for separating out the signals impressed on the television carrier at the ground station by the receiver 33. This may be done by any of various expedients known to those skilled in the art; for example, the amplitude, the repetition frequency, or the pulse width of the signals from the receiver 33 may be used to distinguish them from the other components of the received signal. In the present example, the pulse shaper 41 forms the range pulses from the receiver 33 to have characteristics different from those of all other pulses on the television channel.

These separated signals are applied to the terminals 49 of the pulse interval timer 45. The output terminals of the timer 45, besides being connected to the meter 47, may be connected to other equipment, not shown, such as an automatic flight control system.

In the operation of the system of Figure 1, the pulse generator 19 produces a continuous train of brief pulses at a repetition rate of, for example, 600 per second. One such pulse 53 is shown on the top line of Figure 2. Each pulse 53 modulates the transmitter 1 to provide a corresponding pulse of radio frequency energy which is radiated by the antenna 7, and also triggers the sawtooth wave generator 15 to start a radial scan of the beam in the cathode ray tube 5. Since the motor 11 rotates the antenna 7 sixty degrees per second, ten pulses are radiated during each degree of antenna rotation. As the beam sweeps through the position occupied by the aircraft carrying the receiver 37, a number of successive pulses are picked up, applied to the transmitter 39, and retransmitted on the carrier frequency $f_2$. The pulse 55 in the second line of Figure 2 is that appearing in the output of the receiver 37 in response to the pulse 53. The pulse 55 is delayed with respect to the pulse 53 by the time required for radiation to travel from the ground station to the aircraft.

The retransmitted pulses are received at the ground station by the antenna 9 and the receiver 3, and applied to the cathode ray tube 5 to momentarily turn on or intensify the beam, causing a luminescent spot to appear on the screen. The pulse 57 (third line of Figure 2) is that produced by the receiver 3 in response to transmission of the pulse 55 from the aircraft. The position of the spot on the screen corresponds to the map position or plan position of the aircraft with respect to the ground station. The same sequence of transmission and reception occurs as the antennas 7 and 9 rotate to bear on other similarly equipped aircraft, and other corresponding spots are produced, providing a complete PPI display during each antenna revolution. This display and the image of the map 23 are picked up by the camera 21 and broadcast by the transmitter 29. The receiver 35 on any aircraft in the service area of the system picks up the television signal and reproduces the PPI display and map on the cathode ray tube 51.

The distance of any particular craft from the ground station is indicated by the distance of the corresponding spot in the PPI display from the deflection center on the screen of the tube 5. Since the display is relayed to the craft by television, the information is available in the same form aboard the aircraft. However, this type of presentation of range information (i. e., the distance between two spots on a screen) is not conveniently adaptable to automatic flight control, nor does it provide a direct numerical indication.

The pulses 55, besides being retransmitted immediately by the transmitter 39, are delayed 1/30 second in the network 43, providing similar pulses 59. It should be noted that the 1/30 second delay is not shown to the same scale as the other time intervals in Figure 2, since it is of the order of one hundred thousand times as great as the interval between the pulses 55 and 57, for example. During the 1/30 second period, the antennas 7, 9 and 31 rotate two degrees, so that the directive axis of the antenna 31 bears on the aircraft when the pulses 59 are applied to and transmitted by the transmitter 39 on the carrier frequency $f_2$.

The second pulse signal from the transmitter 39 is picked up by the antenna 31, and each transmitted pulse 59 results in a pulse 61 (fifth line of Figure 2) at the output of the receiver 33. The pulse 61 is applied through the mixer 27 to the television transmitter 29, and is received at the airborne television receiver 35 to provide a pulse 63, shown on the bottom line of Figure 2. The pulse 63 is delayed with respect to the pulse 59 by twice the time required for radiation to travel the distance between the aircraft and the ground station.

Each pulse 59 turns on the interval timer circuit 45, starting the flow of current through the meter 47. Each corresponding pulse 63 stops the current. Thus the average current depends on the intervals between the pulses 59 and 63, and is proportional to the range. The average voltage across the meter 47 is likewise proportional to range, and may be used to actuate a follow-up or other control equipment, not shown, in accordance with the range.

It will be noted that range information is supplied only during the relatively brief intervals when the directive beam of the antenna 31 is bearing on the aircraft. If a continuous indication of range is desired, the meter 47 may be damped, either electrically or mechanically, enough to integrate or average the output of the interval timer 45 over the entire rotation period of the antenna 31, or other known means can be employed for storing range data between successive sweeps of the ground station antennas.

I claim as my invention:

1. In a radio navigation system of the type comprising a ground based radar system providing a plan position indication of aircraft in the service area of a ground station and television means for reproducing said indication aboard said aircraft, a system for providing on an aircraft a control signal corresponding to the range of said aircraft from said ground station, comprising means on said craft responsive to signals received from said ground-based radar to transmit a characteristic signal and to initiate simultaneously the flow of a control current, means at said ground station responsive to said characteristic signal to produce a similar signal and to apply said similar signal to said television means for transmission to said craft, and means on said craft responsive to said last-mentioned signal to stop the flow of said control current.

2. In a radio navigation system of the type comprising a ground based radar system transmitting a beam of pulse modulated signals and sweeping said beam continuously in azimuth to provide a plan position indication of aircraft in the service area of a ground station and television means for reproducing said indication aboard said aircraft, a system for providing on an aircraft a control signal corresponding to the range of said aircraft from said ground station, comprising means on said craft responsive to said pulse modulated signals to transmit a delayed similarly modulated signal, means at said ground station responsive to said delayed signal to produce a similar signal and to apply said similar signal to said television means for transmission to said craft, and pulse interval timer means on said craft responsive to said last-mentioned signal and to said delayed signal as transmitted from said craft to provide an output proportional to said range.

3. In a radio navigation system of the type comprising a ground based radar system transmitting a rotating beam of pulsed signals to produce a plan position indication of aircraft in the service area of a ground station and television means for reproducing said indication aboard said aircraft, a system for providing on an aircraft a control signal corresponding to the range of said aircraft from said ground station, comprising means on said craft responsive to said pulsed signals to transmit similar signals with a predetermined delay, directional receiver means at said ground station responsive to said delayed signals to produce similar signals and to apply said similar signals to said television means for transmission to said craft, and means on said craft responsive to said last-mentioned signals and to said delayed signals as transmitted from said craft to provide an output proportional to said ranges.

4. A radio navigation system including a ground station providing a beam of pulsed radio signals, said beam being swept continuously in azimuth, a mobile station including means responsive to said signals to transmit similarly pulsed signals substantially without delay and means to transmit other similarly pulsed signals having a predetermined delay with respect to said signals as received at said mobile station from said ground station, directional receiver means at said ground station responsive to said delayed signals transmitted from said mobile station to reproduce said delayed signals at said ground station, means transmitting said reproduced signals substantially without additional delay, receiver means at said mobile station responsive to said last-mentioned signals, and pulse interval timer means responsive to said receiver means and to said original delayed signals to provide an output corresponding to the range of said mobile station from said ground station.

5. A radio navigation system including a ground station providing a beam of pulsed radio signals, said beam being swept continuously in azimuth, a mobile station including means responsive to said signals to transmit similarly pulsed signals substantially without delay and means to transmit other similarly pulsed signals having a predetermined delay with respect to said signals as received at said mobile station from said ground station, directional receiver means at said ground station responsive to said delayed signals transmitted from said mobile station to reproduce said delayed signals at said ground station, the direction of maximum response of said directional receiver means being swept in synchronism with and maintained at a predetermined angle to said beam, means transmitting said reproduced signals substantially without additional delay, receiver means at said mobile station responsive to said last-mentioned signals, and pulse interval timer means responsive to said receiver means and to said original delayed signals to provide an output corresponding to the range of said mobile station from said ground station.

DOUGLAS H. EWING.

REFERENCES CITED

The following references are of record in the file of this patent:

UNITED STATES PATENTS

| Number | Name | Date |
| --- | --- | --- |
| 2,027,527 | Hammond | Jan. 14, 1936 |
| 2,134,716 | Gunn | Nov. 1, 1938 |
| 2,248,215 | Budenbom | July 8, 1941 |
| 2,421,018 | De Rosa | May 27, 1947 |
| 2,436,846 | Williams | Mar. 2, 1948 |